United States Patent Office 2,909,584
Patented Oct. 20, 1959

2,909,584

VULCANIZABLE NATURAL RUBBER COMPOSITION AND METHOD OF VULCANIZING SAME

Carl R. Parks, Akron, Ohio, assignor to The Goodyear Tire & Rubber Company, Akron, Ohio, a corporation of Ohio No Drawing. Application January 23, 1959
Serial No. 788,483

20 Claims. (Cl. 260—775)

This invention relates to the vulcanization of natural rubber. More particularly, this invention relates to an improved method for vulcanizing natural rubber, by the use of a ditertiary peroxide in addition to a sulfur-bearing curing agent including sulfur and/or an accelerator of sulfur vulcanization.

Natural rubber, when vulcanized using conventional formulas containing elemental sulfur, shows a gradual loss in physical properties when overcured or exposed to high temperature or when used over extended periods of time. This loss in physical properties is known in the art as "reversion." Natural rubber can also be cured in the absence of sulfur by the use of curing agents such as tetramethylthiuramdisulfide, which furnish their own sulfur, to give stocks having a flat modulus curve and which show little or no reversion. However, stocks cured with such sulfur-bearing curing agents generally have somewhat lower physical properties than are usually obtained in such stocks cured with sulfur.

It is an object of this invention to provide a composition of natural rubber which gives a high flat modulus curve, even over extended curing times. It is another object of this invention to provide a method of vulcanizing natural rubber by the use of a ditertiary peroxide plus a sulfur-bearing curing agent. Other objects will appear hereinafter as the description of the invention proceeds.

According to this invention natural rubber is heated with a conventional accelerator-sulfur mix in the presence of an organic peroxide in which both atoms of oxygen of the peroxy group are joined to a tertiary carbon atom. Such ditertiary peroxides can be represented by the general formula

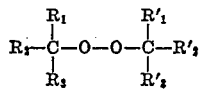

in which $R_1$, $R_2$, $R_3$, $R'_1$, $R'_2$ and $R'_3$ are the same or different aliphatic, cycloaliphatic, cycloalkenyl, aryl or aralkyl hydrocarbon radicals. The aliphatic radicals can be straight or branched chain, saturated or unsaturated. In addition to the parent hydrocarbon radicals, radicals containing various inert substituents such as alkyl, cycloalkyl, aryl, aralkyl, halogen, hydroxy, alkoxy and aryloxy and peroxy groups can also be used. Additional peroxy groups may also be present.

The following examples illustrate the invention. In these tests the stocks were milled on a conventional two-roll rubber mill until the compounding ingredients were thoroughly mixed with the rubber and a homogeneous composition was obtained. Thereafter, rubber sheets were cured in the conventional manner according to the indicated curing conditions after which standard dumbbell samples were dyed from the cured sheets. These samples were pulled apart in a conventional rubber tester. The ultimate tensile strength, elongation, and modulus were taken to illustrate the efficacy of the invention. This standard test procedure is more fully described in "New Autographic Machine for Testing Tensile Properties of Rubber" by George J. Albertoni, Industrial and Engineering Chemistry, Analytical Edition, vol. 3, page 236, 1931.

In Table 1, the proportions are expressed as parts by weight per 100 parts of rubber.

Table 1

| | Compound | | | |
|---|---|---|---|---|
| | A | E | F | G |
| Smoked sheet rubber | 100.0 | 100.0 | 100.0 | 100.0 |
| HAF black | 50.0 | 50.0 | 50.0 | 50.0 |
| Pine tar | | 3.0 | 3.0 | 3.0 |
| Stearic acid | | 3.0 | 3.0 | 3.0 |
| Zinc oxide | | 3.0 | 3.0 | 3.0 |
| Sulfur | | 2.75 | 2.75 | 2.25 |
| Age Rite HP | 1.00 | 1.00 | 1.00 | 1.00 |
| Phenyl-betanaphthylamine | 0.35 | 0.35 | 0.35 | 0.35 |
| NOBS No. 1 | | 0.45 | 0.45 | 0.45 |
| Dicumyl peroxide | 2.0 | | 2.0 | 2.0 |

Age Rite HP is an antioxidant sold by the R. T. Vanderbilt Company and is identified as a mixture containing 65 parts by weight of phenyl-betanaphthylamine and 35 parts by weight of diphenyl-paraphenylenediamine.

NOBS No. 1 is an accelerator sold by American Cyanamid Company and identified as morpholine-2-benzothiazole-sulfenamide.

HAF black is a high abrasion furnace black.

Table 2

| Cure in min. at 275° F. | Compound | | | |
|---|---|---|---|---|
| | A | E | F | G |
| | Ultimate tensile strength in pounds per square inch | | | |
| 30 | 1,060 | | | |
| 60 | 1,710 | 3,860 | 3,750 | 3,520 |
| 120 | 2,330 | 3,620 | 3,330 | 3,600 |
| 240 | 2,610 | 3,290 | 3,210 | 3,400 |
| 480 | 2,800 | 3,250 | 3,130 | 3,270 |
| | Ultimate elongation in percent | | | |
| 30 | 350 | | | |
| 60 | 330 | 475 | 440 | 420 |
| 120 | 320 | 450 | 355 | 400 |
| 240 | 300 | 435 | 360 | 365 |
| 480 | 275 | 450 | 365 | 355 |
| | Modulus at 300% elongation in pounds per square inch | | | |
| 30 | 750 | | | |
| 60 | 1,450 | 2,320 | 2,400 | 2,340 |
| 120 | 2,080 | 2,320 | 2,630 | 2,500 |
| 240 | 2,610 | 2,090 | 2,620 | 2,740 |
| 480 | | 1,980 | 2,520 | 2,720 |
| | Modulus at 200% elongation in pounds per square inch | | | |
| 30 | 280 | | | |
| 60 | 560 | 1,310 | 1,340 | 1,320 |
| 120 | 910 | 1,350 | 1,540 | 1,510 |
| 240 | 1,200 | 1,150 | 1,500 | 1,590 |
| 480 | 1,290 | 1,080 | 1,430 | 1,620 |

The above tables show the effect of adding dicumyl peroxide to a conventional sulfur-accelerator natural rubber stock. Compound A contained dicumyl peroxide but no sulfur. Compound E contained sulfur but no peroxide. Compounds F and G contained peroxide with different amounts of sulfur.

For purposes of illustrating the invention a standard formula was selected for the above tables. It is understood that the accelerator-sulfur-rubber ratios and the amounts of other compounding ingredients can be varied and the beneficial effects of this invention still be obtained.

Various other accelerators of vulcanization with sulfur, of which many varieties are known, may be employed in place of morpholine-2-benzothiazolesulfenamide. Further representative examples are the mercaptothiazoles such as 2-mercaptothiazole, 2-mercaptobenzothiazole and 2-mercaptonaphthothiazole; the thiazyldisulfides such as 2,2'-bis-thiazyldisulfide, 2,2'-bis-benzothiazyldisulfide and 2,2'-bis-naphthothiazyldisulfide; the thiazolesulfenamides such as 2-benzothiazolesulfenamide, N-phenyl-2-benzothiazolesulfenamide, N-cyclohexyl-2-benzothiazolesulfenamide, N-methyl-2-benzothiazolesulfenamide, N-ethyl-2-benzothiazolesulfenamide, N-n-propyl-2-benzothiazolesulfenamide, N-n-butyl-2-benzothiazolesulfenamide, N-tertiarybutyl - 2-benzothiazolesulfenamide, N-secondary-amyl-2-benzothiazolesulfenamide, N-tertiaryamyl-2-benzothiazolesulfenamide, N-N-diisopropyl-2-benzothiazolesulfenamide, and N,N - di(n-butyl)-2-benzothiazolesulfenamide; the thiocarbamylsulfenamides such as N-cyclohexyl dimethylthiocarbamylsulfenamide, N-cyclohexyl di(n-butyl)-thiocarbamylsulfenamide, N-cyclohexyl diamylthiocarbamylsulfenamide, N-isopropyl diethylthiocarbamylsulfenamide, N-isopropyl cyclodiethylene-oxythiocarbamylsulfenamide, and N-secondaryamyl cyclodiethylene-oxythiocarbamylsulfenamide; the dithiocarbamates such as sodium diethyldithiocarbamate, sodium dibutyldithiocarbamate, zinc dibutyldithiocarbamate, lead dimethyldithiocarbamate, sodium cyclodiethyleneoxy-dithiocarbamate, piperidinium pentamethylenedithiocarbamate, and dimethylammonium dimethyldithiocarbamate; the thiuramdisulfides such as tetramethylthiuramdisulfide, tetraethylthiuramdisulfide, tetraphenylthiuramdisulfide, tetracyclohexylthiuramdisulfide and dipentamethylenethiuramdisulfide; and xanthates such as sodium isopropylxanthate, sodium n-butylxanthate and sodium amylxanthate; the dixanthates such as isopropylxanthogendisulfide; salts of dithio acids, such as zinc dithiobenzoate; the dithiodiacyldisulfides such as dithiobenzoyldisulfide; and the nitrogen-containing accelerators such as hexamethylene tetramine, aldehyde-ammonia addition product, furfuramide, hydrobenzamide, piperidine, aniline, methyl aniline, dimethyl aniline, toluidine, phenylene diamine and the substituted guanidines such as monophenyl guanidine, diphenyl guanidine and triphenyl guanidine. The preferred accelerators are the 2-mercaptothiazoles, 2,2'-thiazyldisulfides, 2-thiazolesulfenamides, dithiocarbamates and the thiocarbamylsulfenamides.

The following examples further illustrate the invention. In these tests the stocks were milled on a conventional two-roll rubber mill until the compounding ingredients were thoroughly mixed with the rubber and a homogeneous composition was obtained. The vulcanized samples were tested to determine their ultimate tensile strengths, ultimate elongations and moduli at 300% elongation.

The sulfur bearing curing agent-dicumyl peroxide tests were made in the following rubber formula in which parts are parts by weight:

Ingredients:
Smoked sheet rubber _____ 100.0
HAF black _____ 50.0
Pine tar _____ 3.0
Stearic acid _____ 3.0
Zinc oxide _____ 3.0
Phenyl β-naphthylamine _____ 1.25
Dicumyl peroxide _____ Variable
Curing agent _____ Variable The amounts of dicumyl peroxide and curing agents used in the different tests are listed in Table 3 below:

Table 3

| Curing agent | Compound | | | | | | | | | | | | | | | |
|---|---|---|---|---|---|---|---|---|---|---|---|---|---|---|---|---|
| | A | B | C | D | E | F | G | H | I | J | K | L | M | N | O | P |
| Dicumyl peroxide | | 1.0 | 2.0 | 2.0 | | 1.0 | 2.0 | | 1.0 | 2.0 | | 2.0 | 2.0 | | 2.0 | 2.0 |
| Tetramethylthiuram-disulfide | 3.0 | 3.0 | 3.0 | 2.0 | | | | | | | | | | | | |
| 2-(4-morpholinyldithio)-benzothiazole | | | | | 4.0 | 4.0 | 4.0 | 4.5 | 3.0 | 2.0 | | | | | | |
| N,N'-dithio-bis morpholine | | | | | | | | | | | 3.50 | 3.50 | 1.50 | | | |
| Vultac No. 3 | | | | | | | | | | | | | | | 10.0 | 4.5 |
| 2,2'-bis benzothiazyl-disulfide | | | | | | | | | | | 0.75 | 0.75 | 0.75 | 0.75 | 0.75 | 0.75 |

Table 4

| Cure in minutes at 275° F. | Ultimate tensile strength in pounds per square inch | | | | | | | | | | | | | | | |
|---|---|---|---|---|---|---|---|---|---|---|---|---|---|---|---|---|
| | A | B | C | D | E | F | G | H | I | J | K | L | M | N | O | P |
| 30 | | | | | 3,010 | 2,800 | 2,530 | | | | | | | | | |
| 60 | 3,150 | 3,260 | 3,440 | 3,360 | 3,650 | 3,530 | 3,720 | 3,620 | 3,540 | 3,340 | 3,860 | 3,690 | 3,490 | 3,220 | 2,770 | 2,940 |
| 120 | 2,990 | 3,190 | 3,360 | 3,320 | 3,550 | 3,610 | 3,350 | 3,540 | 3,470 | 3,370 | 3,700 | 3,290 | 3,480 | 3,100 | 2,680 | 2,830 |
| 240 | 3,100 | 3,320 | 3,350 | 3,350 | 3,500 | 3,240 | 3,290 | 3,490 | 3,410 | 3,390 | 3,610 | 3,080 | 3,430 | 2,920 | 2,473 | 2,710 |
| 480 | 3,100 | 3,070 | 3,380 | 3,260 | 3,420 | 3,240 | 3,150 | 3,370 | 3,400 | 3,430 | 3,170 | 2,990 | 3,320 | 2,500 | 2,560 | 2,900 |

| Cure in minutes at 275° F. | Ultimate elongation in Percent | | | | | | | | | | | | | | | |
|---|---|---|---|---|---|---|---|---|---|---|---|---|---|---|---|---|
| | A | B | C | D | E | F | G | H | I | J | K | L | M | N | O | P |
| 30 | | | | | 550 | 525 | 490 | | | | | | | | | |
| 60 | 450 | 475 | 460 | 500 | 455 | 425 | 420 | 445 | 480 | 500 | 460 | 410 | 485 | 455 | 360 | 370 |
| 120 | 425 | 440 | 425 | 460 | 420 | 390 | 315 | 420 | 445 | 450 | 425 | 350 | 450 | 425 | 340 | 355 |
| 240 | 430 | 435 | 400 | 450 | 420 | 340 | 310 | 410 | 420 | 410 | 410 | 320 | 400 | 445 | 330 | 320 |
| 480 | 435 | 425 | 415 | 425 | 410 | 350 | 300 | 390 | 420 | 395 | 405 | 305 | 380 | 425 | 355 | 340 |

Table 5

| Cure in minutes, at 275° F. | Modulus at 300 percent elongation, compound | | | | | | | | | | | | | | | |
|---|---|---|---|---|---|---|---|---|---|---|---|---|---|---|---|---|
| | A | B | C | D | E | F | G | H | I | J | K | L | M | N | O | P |
| 30 | | | | | 1,280 | 1,310 | 1,250 | | | | | | | | | |
| 60 | 1,850 | 1,820 | 2,000 | 1,740 | 2,190 | 2,320 | 2,540 | 2,330 | 1,970 | 1,620 | 2,410 | 2,520 | 1,900 | 2,000 | 2,270 | 2,180 |
| 120 | 1,840 | 2,000 | 2,150 | 1,920 | 2,320 | 2,750 | 3,160 | 2,450 | 2,180 | 1,850 | 2,460 | 2,700 | 2,100 | 2,050 | 2,330 | 2,300 |
| 240 | 1,900 | 2,110 | 2,370 | 1,980 | 2,340 | 2,780 | 3,200 | 2,450 | 2,260 | 2,250 | 2,410 | 2,810 | 2,290 | 1,800 | 2,200 | 2,530 |
| 480 | 1,900 | 1,960 | 2,260 | 2,000 | 2,350 | 2,660 | 3,200 | 2,450 | 2,280 | 2,400 | 2,200 | 2,920 | 2,460 | 1,620 | 2,080 | 2,480 |

In the above rubber formula HAF black is the carbon black known in the art as high abrasion furnace black. Vultac No. 3 is a sulfur-bearing curing agent sold by Sharples Chemical Co. and identified as an alkyl phenol disulfide.

The above tables show the effect of the curing of rubber with tetramethylthiuramdisulfide, 2-(4-morpholinyl dithio) benzothiazole, N,N'-dithio-bis morpholine and an alkyl phenol disulfide, respectively, in combination with dicumyl peroxide. Various other "sulfur-bearing" curing agents can also be used, including for example the thiuramdisulfides such as tetramethylthiuramdisulfide, tetraethylthiuramdisulfide, tetraphenylthiuramdisulfide, tetracyclohexylthiuramdisulfide and dipentamethylenethiuramdisulfide, the dixanthates such as isopropylxanthogendisulfide, the dithiodiacyldisulfides such as dithiobenzoyldisulfide, the aminepolysulfides such as dithio-bis-diethylamine, dithio-bis-dipropylamine, dithio-bis-dibutylamine, dithio-bis-dicyclohexylamine and dithio-bis-morpholine, the alkyl thiocarbamyl polysulfides such as tertiary butyl dimethylthiocarbamyl disulfide and tertiary butyl dimethylthiocarbamyltrisulfide and the N-substituted dithio thiazoles such as the amino dithio thiazoles 2-(dimethyl-amino dithio) - benzothiazole, 2 - (diethylamino dithio) - benzothiazole, 2-(dicyclohexyl amino dithio)-benzothiazole and 2-(4-morpholinyl dithio)-benzothiazole. In general, any of those curing agents which give us sulfur to the rubber during vulcanization can be used in the process of this invention.

The amount of sulfur-bearing curing agent required for the process of this invention will depend somewhat on the particular material employed and may be varied over wide ranges. While smaller or larger amounts can be used, the amount will usually be within the range from 0.5 to 10.0 parts, with the preferred range usually being from 1.0 to 3.0 parts per 100 parts by weight of the natural rubber. The customary compounding practices used with a particular curing agent are followed. Thus, where it is customary to use zinc oxide or stearic acid or some other material with a particular curing agent that practice is followed here.

The invention is further illustrated wherein rubber stocks were prepared according to the following standard formulation:

|  | (1) Control—No peroxide | (2) Control and 2 parts dicumyl peroxide | (3) Control and 2 parts cumene hydro-peroxide[1] | (4) Control and 4.5 parts lauroyl peroxide[2] |
|---|---|---|---|---|
| Natural rubber smoked sheets | 100 | 100 | 100 | 100 |
| HAF carbon black | 50 | 50 | 50 | 50 |
| Pine tar | 3 | 3 | 3 | 3 |
| Stearic acid | 3 | 3 | 3 | 3 |
| Zinc oxide | 3 | 3 | 3 | 3 |
| Mixture of 33⅓% by weight of diphenyl p-phenylene diamine and 66⅔% phenyl beta naphthyl amine | 1 | 1 | 1 | 1 |
| Phenylbetanaphthyl amine | 0.25 | 0.25 | 0.25 | 0.25 |
| Sulfur | 2.75 | 2.75 | 2.75 | 2.75 |
| Morpholinebenzothiazylsulfenamide | 0.45 | 0.45 | 0.45 | 0.45 |
| Dicumyl peroxide |  | 2.0 |  |  |
| Cumene hydroperoxide |  |  | 2.0 |  |
| Lauroyl peroxide |  |  |  | 4.5 |

[1] Milled 10'/300° F.
[2] Milled 5'/250° F.

Sample (1) was a control containing no peroxide. Sample (2) was a control containing 2 parts dicumyl peroxide in accordance with the invention claimed in this application. Sample (3) was the control compound (1) plus 2 parts by weight of cumene hydroperoxide treated by milling for ten minutes at 300° F. prior to curing as indicated in the following table. Sample 4 was the control compound (1) plus 4.5 parts by weight of lauroyl peroxide treated by milling for 5 minutes at 250° F. prior to curing as indicated in the following table. Table 6 recites the data obtained from samples cured and tested according to standard rubber testing procedures.

Table 6

|  | Cure, minutes at 275° F. | Tensile | 300% modulus | Ultimate elongation |
|---|---|---|---|---|
| Sample 1—Control | 30 | 3,230 | 1,440 | 550 |
|  | 60 | 3,590 | 1,880 | 500 |
|  | 120 | 3,390 | 1,860 }[1] 15% | 480 |
|  | 240 | 3,180 | 1,760 | 470 |
|  | 480 | 2,730 | 1,600 | 440 |
| Sample 2—Control plus 2 parts dicumyl peroxide | 30 | 3,700 | 1,620 | 555 |
|  | 60 | 3,590 | 2,130 | 450 |
|  | 120 | 3,390 | 2,250 }[1] 7.5% | 410 |
|  | 240 | 3,270 | 2,150 | 405 |
|  | 480 | 2,870 | 2,080 | 380 |
| Sample 3—Control plus 2 parts cumene hydroperoxide (milled 10'/300° F.) | 30 | 1,480 | 1,210 | 400 |
|  | 60 | 2,380 | 1,850 | 345 |
|  | 120 | 2,300 | 1,920 }[1] 16% | 340 |
|  | 240 | 2,040 | 1,640 | 345 |
|  | 480 | 2,050 | 1,620 | 345 |
| Sample 4—Control plus 4.5 parts lauroyl peroxide (milled 5'/250° F.) | 30 | 1,790 | 1,060 | 410 |
|  | 60 | 2,810 | 1,710 | 425 |
|  | 120 | 2,770 | 2,090 }[1] 21% | 370 |
|  | 240 | 2,440 | 1,820 | 365 |
|  | 480 | 2,780 | 1,650 | 425 |

[1] Percent reversion from point of high modulus to modulus at curing time of 480 minutes.

The above data clearly illustrate that the practice of this invention, as illustrated by Sample 2, results in much less reversion than prior art practices illustrated by Samples 3 and 4.

The customary compound practices used with the particular accelerators are followed. Where it is customary to use zinc oxide or stearic acid or some other such material in conjunction with the accelerator, that material is used in the compounding formulas in this invention. Other types of natural rubber can be employed and various other compounding material such as clays, processing oils, waxes, tackifying agents and other ingredients can be used. The materials can be mixed together in the conventional manner on a two-roll mill, as illustrated, or by using a Banbury internal mixer.

Various tertiary peroxides of the general formula shown above may be used in the practice of this invention. It is obvious that in selecting a peroxide for use in this invention the peroxide should be stable at the temperature of mixing of the rubber composition so that it can be mixed without decomposing and that the peroxide should break down at a reasonable rate under the curing conditions used so that it can enter into the curing reactions. Representative examples of such peroxides are ditertiarybutyl peroxide, ditertiaryamyl peroxide, 2,2-di-(tertiarybutylperoxy) butane, di(alpha,alpha-dimethylbenzyl) peroxide (also known as dicumene or dicumyl peroxide), di(alpha,alpha - dimethyl - p - chlorobenzyl) peroxide, di-(alpha,alpha-dimethyl-2,4-dichlorobenzyl) peroxide, tertiarybutyl-1-methylcyclohexyl peroxide, and peroxides formed by the oxidation of terpene hydrocarbons such as turpentine, alphapinene, para-methane and pinane. Of these peroxides, the dicumyl peroxide is the preferred variety.

The invention is illustrated in the above-described experiments with respect to the use of from one to two parts of peroxide per 100 parts by weight of rubber. However, more or less of the peroxide can be used as desired, from 0.5 to 5.0 parts by weight of the peroxide per 100 parts by weight of natural rubber generally being satisfactory. The preferred range of the peroxide is from 1.0 to 3.0 parts by weight of the peroxide per 100 parts by weight of natural rubber.

The 275° F. vulcanization temperature of the examples is illustrative and can be varied while still obtaining the benefits of the invention. In general any temperature can be used which is in the usual range that is used for the conventional vulcanization of rubber with sulfur in a mold under heat and pressure. These temperatures vary somewhat with the choice of accelerator and other compounding ingredients but are generally in the range from 250 to 320° F.

The curing should be carried out under the conditions attained in a pressure cure as in a mold because it has been found that the beneficial results of this invention are not fully realized under the conditions of air curing.

The term "sulfur-bearing curing agent" is intended to include free sulfur and the sulfur releasing curing agents such as those listed herein.

For purposes of illustrating the invention standard formulae were selected for the above tables. The ratio of sulfur-bearing curing agent to ditertiary peroxide to natural rubber can be varied to adjust the properties of the stock to meet the specifications for the particular goods being made. The other compounding ingredients can also be varied in amount and other compounding materials such as clays, processing oils, waxes, tackifying agents and other ingredients can be used in conjunction with the ditertiary peroxide and the sulfur-bearing curing agent. Other types of natural rubber can be employed.

The materials can be mixed together in the conventional manner on a two-roll mill, as illustrated, or by some other suitable method as by using a Banbury internal mixer.

While certain representative embodiments and details have been shown for the purpose of illustrating the invention, it will be apparent to those skilled in this art that various changes and modifications may be made therein without departing from the spirit or scope of the invention. This application is a continuation-in-part of Serial Numbers 516,651 and 516,740, filed on June 20, 1955.

I claim:

1. The method of vulcanizing natural rubber which comprises heating and pressing it in a mold in the presence of a sulfur-bearing curing agent for a rubber containing ethylenic unsaturation, and from 0.5 to 5.0 parts by weight, per 100 parts by weight of the natural rubber, of a peroxide of the general formula:

$$R_2-\underset{R_3}{\underset{|}{\overset{R_1}{\overset{|}{C}}}}-O-O-\underset{R'_3}{\underset{|}{\overset{R'_1}{\overset{|}{C}}}}-R'_2$$

in which $R_1$, $R_2$, $R_3$, $R'_1$, $R'_2$ and $R'_3$ are selected from the group consisting of aliphatic, cycloaliphatic, cycloalkenyl, aryl and aralkyl hydrocarbon radicals.

2. The method of vulcanizing natural rubber which comprises heating and pressing it in a mold in the presence of sulfur, an accelerator of vulcanization and from 0.5 to 5.0 parts by weight, per 100 parts by weight of the natural rubber, of a peroxide of the general formula $$R_2-\underset{R_3}{\underset{|}{\overset{R_1}{\overset{|}{C}}}}-O-O-\underset{R'_3}{\underset{|}{\overset{R'_1}{\overset{|}{C}}}}-R'_2$$

in which $R_1$, $R_2$, $R_3$, $R'_1$, $R'_2$ and $R'_3$ are selected from the group consisting of aliphatic, cycloaliphatic, cycloalkenyl, aryl and aralkyl hydrocarbon radicals.

3. The method of vulcanizing natural rubber which comprises heating and pressing it in a mold in the presence of sulfur, an accelerator of vulcanization and from 0.5 to 5.0 parts by weight of dicumyl peroxide per 100 parts by weight of the natural rubber.

4. The method of vulcanizing natural rubber which comprises heating and pressing it in a mold in the presence of sulfur, an accelerator selected from the group consisting of 2-mercaptothiazoles, 2,2'-thiazyldisulfides, thiazolesulfenamides, thiocarbamylsulfenamides and dithiocarbamates and from 0.5 to 5.0 parts by weight of dicumyl peroxide per 100 parts by weight of the natural rubber.

5. The method of vulcanizing natural rubber which comprises heating and pressing natural rubber in a mold with a sulfur-bearing curing agent for a rubber containing ethylenic unsaturation in the absence of added free sulfur and from 0.5 to 5.0 parts by weight, per 100 parts by weight of the natural rubber, of a peroxide of the general formula $$R_2-\underset{R_3}{\underset{|}{\overset{R_1}{\overset{|}{C}}}}-O-O-\underset{R'_3}{\underset{|}{\overset{R'_1}{\overset{|}{C}}}}-R'_2$$

in which $R_1$, $R_2$, $R_3$, $R'_1$, $R'_2$ and $R'_3$ are radicals selected from the group consisting of aliphatic, cycloaliphatic, cycloalkenyl, aryl and aralkyl hydrocarbon radicals.

6. The method according to claim 5 wherein the peroxide is dicumyl peroxide and the curing agent is selected from the group consisting of thiuramdisulfides, dixanthates, dithioacyldisulfides, amine polysulfides and amino dithio benzothiazoles.

7. A vulcanizable rubber composition comprising natural rubber, a sulfur-bearing curing agent for a rubber containing ethylenic unsaturation and from 0.5 to 5.0 parts by weight, per 100 parts by weight of the natural rubber, of the general formula $$R_2-\underset{R_3}{\underset{|}{\overset{R_1}{\overset{|}{C}}}}-O-O-\underset{R'_3}{\underset{|}{\overset{R'_1}{\overset{|}{C}}}}-R'_2$$

in which $R_1$, $R_2$, $R_3$, $R'_1$, $R'_2$, and $R'_3$ are selected from the group consisting of aliphatic, cycloaliphatic, cycloalkenyl, aryl and aralkyl hydrocarbon radicals.

8. A vulcanizable rubber composition comprising natural rubber, sulfur, an accelerator of vulcanization and from 0.5 to 5.0 parts by weight, per 100 parts by weight of the natural rubber, of a peroxide of the general formula $$R_2-\underset{R_3}{\underset{|}{\overset{R_1}{\overset{|}{C}}}}-O-O-\underset{R'_3}{\underset{|}{\overset{R'_1}{\overset{|}{C}}}}-R'_2$$

in which $R_1$, $R_2$, $R_3$, $R'_1$, $R'_2$ and $R'_3$ are selected from the group consisting of aliphatic, cycloaliphatic, cycloalkenyl, aryl and aralkyl hydrocarbon radicals.

9. A vulcanizable rubber composition comprising natural rubber, sulfur, an accelerator of vulcanization and from 0.5 to 5.0 parts by weight of dicumyl peroxide per 100 parts by weight of said natural rubber.

10. A vulcanizable rubber composition comprising natural rubber, sulfur, 2-mercaptobenzothiazole and from 0.5 to 5.0 parts by weight of dicumyl peroxide per 100 parts by weight of said natural rubber.

11. A vulcanizable rubber composition comprising natural rubber, sulfur, 2,2'-bis-benzothiazyldisulfide and from 0.5 to 5.0 parts by weight of dicumyl peroxide per 100 parts by weight of said natural rubber.

12. A vulcanizable rubber composition comprising natural rubber, sulfur, N-oxydiethylene-2-benzothiazolesulfenamide and from 0.5 to 5.0 parts by weight of dicumyl peroxide per 100 parts by weight of said natural rubber.

13. A vulcanizable rubber composition comprising natural rubber, sulfur, N-cyclohexyl-2-benzothiazolesulfenamide and from 0.5 to 5.0 parts by weight of dicumyl peroxide per 100 parts by weight of said natural rubber.

14. A vulcanizable rubber composition comprising natural rubber, sulfur, N,N-diisopropyl-2-benzothiazolesulfenamide and from 0.5 to 5.0 parts by weight of dicumyl peroxide per 100 parts by weight of said natural rubber.

15. A vulcanizable rubber composition comprising natural rubber, a sulfur-bearing curing agent for a rubber containing ethylenic unsaturation and from 0.5 to 5.0 parts by weight, per 100 parts by weight of the natural rubber, of a peroxide of the general formula $$R_2-\underset{R_3}{\underset{|}{\overset{R_1}{\overset{|}{C}}}}-O-O-\underset{R'_3}{\underset{|}{\overset{R'_1}{\overset{|}{C}}}}-R'_2$$

in which $R_1$, $R_2$, $R_3$, $R'_1$, $R'_2$ and $R'_3$ are selected from the group consisting of aliphatic, cycloaliphatic, cycloalkenyl, aryl and aralkyl hydrocarbon radicals, but free from elemental sulfur.

16. A vulcanizable rubber composition comprising natural rubber, from 0.5 to 5.0 parts by weight of dicumyl peroxide and a sulfur-bearing curing agent for a rubber containing ethylenic unsaturation.

17. A vulcanizable rubber composition comprising natural rubber, tetramethyl thiuram disulfide and from 0.5 to 5.0 parts by weight of dicumyl peroxide per 100 parts by weight of said natural rubber.

18. A vulcanizable rubber composition comprising natural rubber, 2-(4-morpholinyldithio)-benzothiazole and from 0.5 to 5.0 parts by weight of dicumyl peroxide per 100 parts by weight of said natural rubber.

19. A vulcanizable rubber composition comprising natural rubber, dithio-bis morpholine and from 0.5 to 5.0 parts by weight of dicumyl peroxide per 100 parts by weight of said natural rubber.

20. A vulcanizable rubber composition comprising natural rubber, an alkyl phenol disulfide and from 0.5 to 5.0 parts by weight of dicumyl peroxide per 100 parts by weight of said natural rubber.

No references cited.

UNITED STATES PATENT OFFICE
CERTIFICATE OF CORRECTION

Patent No. 2,909,584                                    October 20, 1959

Carl R. Parks

It is hereby certified that error appears in the printed specification of the above numbered patent requiring correction and that the said Letters Patent should read as corrected below.

Columns 3 and 4, Table 3, under compound "N", opposite "Vultac No. 3", strike out the leaders and insert instead -- 10.0 --; column 5, line 27, for "give us" read -- give up --; column 6, line 32, for "compound" read -- compounding --.

Signed and sealed this 31st day of May 1960.

(SEAL)
Attest:

KARL H. AXLINE
Attesting Officer

ROBERT C. WATSON
Commissioner of Patents